United States Patent [19]

Isayama et al.

[11] Patent Number: 4,705,221
[45] Date of Patent: Nov. 10, 1987

[54] QUANTITATIVE CONTINUOUS FEEDING METHOD FOR IODINE

[75] Inventors: Muneo Isayama, Oami-shirasato; Shoichi Midorikawa, Shirako, both of Japan

[73] Assignee: Ise Kagaku Kogyo Kabushiki Gaisha, Tokyo, Japan

[21] Appl. No.: 896,236

[22] Filed: Aug. 14, 1986

[30] Foreign Application Priority Data

Aug. 14, 1985 [JP] Japan .................................. 60-177594

[51] Int. Cl.$^4$ ............................................. B02C 13/00
[52] U.S. Cl. .......................................... 241/27; 141/1; 141/78; 241/47; 241/DIG. 14
[58] Field of Search ..................... 138/37, 40, 44, 45; 141/1, 98; 198/657; 222/638; 241/6, 12, 16, 18, 27, 37.5, 47, 101.2, 111, 224, DIG. 14

[56] References Cited

U.S. PATENT DOCUMENTS

| 2,155,374 | 4/1939 | Hartog ......................... 241/DIG. 14 |
| 3,897,016 | 7/1975 | Shah ................................. 241/224 X |
| 4,552,566 | 11/1985 | Kita et al. ............................ 23/313 R |

Primary Examiner—Stephen Marcus
Assistant Examiner—Mark Thronson
Attorney, Agent, or Firm—Oblon, Fisher, Spivak, McClelland & Maier

[57] ABSTRACT

The invention relates to an apparatus and a method for the quantitative continuous feeding of iodine by inputting iodine into a hopper under sealed conditions, connecting the lower part of the hopper with a reactor under sealed conditions, having a valve to open and close the passage and installing a quantitative meter to determine the quantity of iodine and feed a constant quantity of iodine to the reactor.

8 Claims, 6 Drawing Figures

QUANTITATIVE CONTINUOUS FEEDING METHOD FOR IODINE

BACKGROUND OF THE INVENTION

1. Field of the Invention

The present invention is related to a quantitative continuous feeding method for iodine.

2. Discussion of the Background

In the conventional methods for supplying a certain quantity of iodine to a reactor, a constant quantity of iodine has generally been put manually through an upper charging port of the reactor by means of a small plastic scoop at certain intervals.

However, this is a poor method of supplying iodine due to the loss of iodine accompanied with charging and the negative effect on the health of the operator, due to the sublimation of the iodine.

Another method being considered involves supplying iodine to a reactor under melting conditions (melting point 113.7° C.). However, this method is not practical for a variety of reasons, for example, visual hindrance due to cold caking of the iodine at the jet port, corrosion of equipment and the necessity for warming.

The best measure is to determine the quantity of iodine under sealed conditions and supply it to the reactor.

Additional problems arise due to the fact that iodine is generally in the form of broken flakes mixed with powdered iodine in which the particles have a diameter of several millimeters. Due to the tendency of iodine to sublime the iodine is apt to cause caking and lose its fluidity, causing problems during metering of the iodine. Moreover, the construction materials of the reactor must be able to resist these strong corrosive properties of iodine.

SUMMARY OF THE INVENTION

Accordingly, one object of the present invention is to provide a novel method for the quantitative continuous feeding of iodine which enables a constant quantity of iodine to be fed.

Another object of the invention is to provide a method for the quantitative continuous feeding of iodine by giving the iodine fluidity by using globular iodine.

Still another object of the invention is to provide an apparatus capable of the quantitative continuous feeding of iodine.

These objects and other objects of the invention, which will become apparent from the following specification, have been achieved by the novel method of the present invention in which iodine is fed into a hopper under sealed conditions, connecting the lower part of the hopper with a reactor having a valve to close and open the connecting passage, installing a quantitative meter to determine iodine and feeding a constant quantity of iodine to the reaction vessel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figures 1, 2:
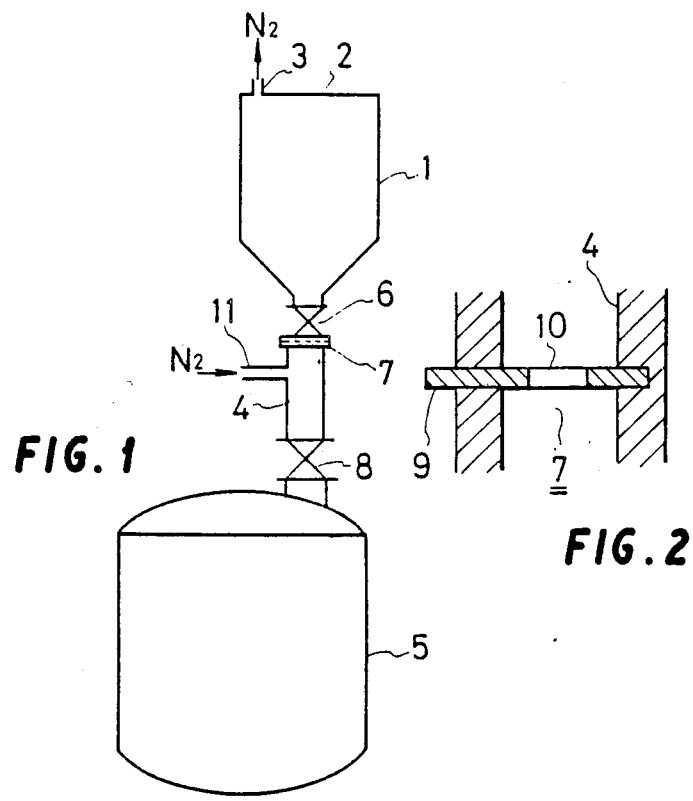
FIG. 1 is the front elevation of the first exemplary embodiment of the apparatus for the quantitative continuous feeding method of the present invention.
FIG. 2 is a sectional view showing the quantitative meter.

In the drawings, symbol 1 is the hopper, symbol 4 is the passage, symbol 5 is the reactor, and symbol 7 is the quantitative meter.

The iodine to be applied to this invention is in globular form. Because of the small surface area, the globular iodine does not cake by adhesion to powdered iodine as has been experienced in the case of conventional flake iodine, and has sufficient fluidity.

The first exemplary embodiment of this invention using the above mentioned globular iodine is explained in detail with reference to FIG. 1 and FIG. 2.

Globular iodine is charged into a hopper 1 with the capacity to store 100 to 300 liters from a transportation drum. The hopper 1 is constructed to be sealable, and is prepared with a discharging port 3 in a part of the cover 2 to discharge $N_2$ gas from the hopper. A passage 4 is present in the lower part of the hopper 1 and connects with the reactor 5 where reaction of the iodine takes place.

A valve 6 for opening and closing this connecting passage is located in the upper part of the passage 4, and the quantitative meter 7 is positioned below the valve 6. A valve 8 is positioned below the quantitative meter 7. The quantitative meter 7 is constructed as shown in FIG. 2 with an orifice plate 9 which is installed so that it can be freely inserted and removed. The orifice plate 9 has an orifice hole 10, which allows a certain quantity of iodine to be supplied by passing iodine through this orifice hole for the necessary period of time. Accordingly, varying quantities of iodine can be supplied over an identical period of time, by using various plates 9 each having a different number of orifice holes.

Further, a $N_2$ gas introduction tube 11 is installed in passage 4 to supply $N_2$ gas to the hopper 1 so that the moisture in the air will not adhere to the iodine.

In the present invention, the required quantity of iodine is supplied to the reactor 5 by opening upper and lower valves 6 and 8 for a required period of time. The upper and lower valves 6 and 8 may be opened independently.

A detailed description of the manufacture of potassium iodide in accordance with the first exemplary embodiment will now be made. The reaction is performed by inputting in order, 250 kg of iodine, 150 liters of distilled water, and potassium hydroxide (48%) into a reactor with a 500 liter capacity. The water and potassium hydroxide are added in small quantities over a period of time in accordance with the status of reaction. After the completion of this reaction, a portion of the potassium iodate produced is reduced to potassium iodide by adding 15 kg of a reducing agent, for example iron powder, stirring the contents of the reactor with heating, filtering, concentrating, and precipitating the potassium iodide as a crystalline powder.

According to the method described above, iodine can be supplied in a certain quantity with no hindrance of the reaction.

Figure 3:
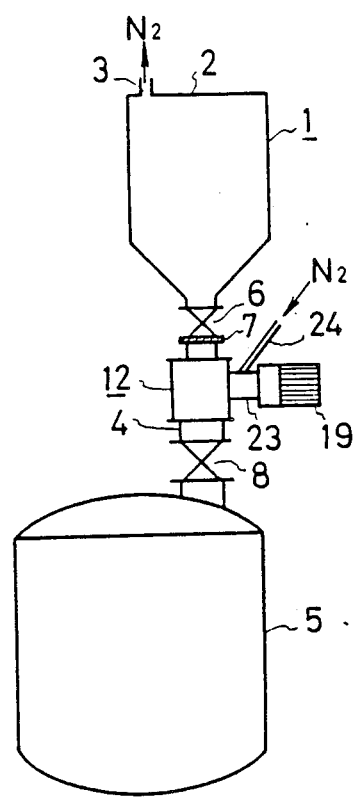
FIG. 3 is the front elevation of the second exemplary embodiment.

The second exemplary embodiment of this invention will now be explained with reference to FIG. 3–5. The method of this invention can be performed by installing a crusher 12 between the quantitative meter 7 and valve 8 as shown in the first exemplary embodiment.

The crusher 12 is open to the lower portion and front portion of the body 13 of which the upper face is in the form of a circular arc and has attached to it a cover plate 14 which can be freely removed. The upper face of the body 13 has an addition port 15 which connects with passage 4. The whole lower area of the crusher is opened and connected to passage 4. On the interior of body 13, four rotary blades 16 are arranged horizontally at equal intervals, and are mutually connected with connecting rods 17. A shaft 18 is installed at the center of the continuous vertical connecting rod 17 having its end extending to the outside of the body 13, so that the shaft 18 can be driven with an electric motor 19. Further, fixed blades 20, 20' and 20" are attached respectively to both sides and the lower center of the inside of body 13. Circular arc type wear plate 21 is fixed between the lower center and one side (reverse rotational side) of fixed blades 20 and 20" to prevent iodine from falling down. The globular iodine falls through addition port 15 and is contacted by the rotary blade 16, crushed and is further cut between the fixed blades 20, 20' and 20" and the rotary blades 16 and accumulates on the wear plate 21. The accumulated iodine is finely crushed by the fixed blade 20' and the rotary blades 16 and powdered. It then falls down into passage 4.

Figure 4:
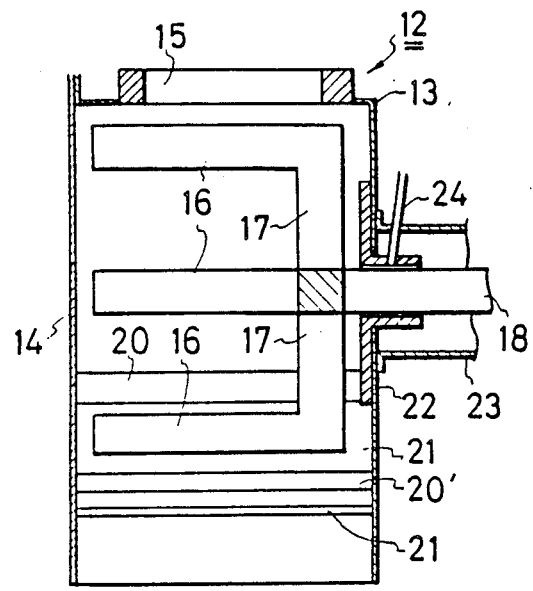
FIG. 4 is the longitudinal sectional front view of the crusher.
Figure 5:
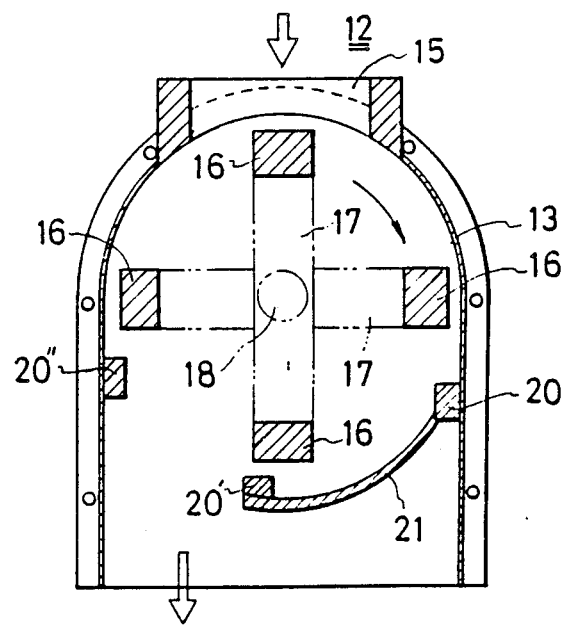
FIG. 5 is the longitudinal sectional side view.

Shaft 18 is supported on a bearing support 22 attached to the body 13 and is free to rotate, as shown in FIG. 4. A shaft-cover 23 is located around the shaft 18 and is fixed to the body 13 and motor 19. A $N_2$ gas addition tube 24 is installed through this shaft-cover 23 and bearing support 22, so that $N_2$ gas can be blow onto the shaft 18 to lubricate and cool the shaft as well as to prevent the outflowing of iodine powder and/or vapor to the outside. The $N_2$ gas also prevents the intrusion of moist outside air into the body 13 and hopper 1. It is arranged to discharge $N_2$ gas through the discharging port in the same manner as in the first exemplary embodiment.

Crusher 12 is made totally of Hastelloy, to prevent corrosion.

Other than as described above, the remaining operation of the second exemplary embodiment is identical to that of the first exemplary embodiment, and therefore, a further detailed explanation will be omitted. With the second exemplary embodiment, globular iodine is crushed to a powder, the powdered iodine is supplied to the reactor 5 and the reaction can, therefore, be completed in a shorter time period.

Sample conditions for operating the crusher are indicated in Table 1.

TABLE 1

| | Raw material | No. 1 | No. 2 | No. 3 | No. 4 | No. 5 | No. 6 |
|---|---|---|---|---|---|---|---|
| Motor RPM | | 2,700 | 2,700 | 5,700 | 5,700 | 7,100 | 7,100 |
| Diameter of orifice hole (mm) | | 12 | 16 | 1 | 16 | 12 | 16 |
| Rte of flow (kg/m) | | 2.1 | 5.8 | 2.1 | 5.8 | 2.1 | 5.8 |

TABLE 1-continued

| | Raw material | No. 1 | No. 2 | No. 3 | No. 4 | No. 5 | No. 6 |
|---|---|---|---|---|---|---|---|
| Grain - size 0.5 or smaller | 0.1 | 17.0 | 21.2 | 41.3 | 41.2 | 43.0 | 51.2 |
| Distribution of the iodine obtained (mm) | | | | | | | |
| 0.5–1.0 | 0.7 | 32.8 | 32.1 | 45.1 | 40.2 | 48.2 | 38.6 |
| 1.0–1.5 | 9.9 | 46.3 | 38.4 | 13.6 | 18.5 | 8.8 | 10.2 |
| 1.5 or larger | 89.3 | 3.6 | 8.2 | 0.1 | 0.1 | 0.02 | 0.03 |

A detailed description of the manufacture of iodoform in accordance with the second exemplary embodiment will now be given. A nonionic surface active agent is added to a reactor with a 1.5 m³ capacity and made liquid by the addition of solvent or by heating. Twenty kg of powdered iodine which has been crushed by the crusher is then added and the whole mixture is stirred for 6–8 hours maintaining the temperature at 60° C. Then, 730 kg of purified water is added gradually while stirring until the reaction mixture becomes uniform. One hundred kg of 85% food additive phosphoric acid is then added and the mixture is stirred for an additional 1–2 hours until the mixture becomes uniform, and iodoform is obtained.

The manufacture of copper iodide by the method of the second exemplary embodiment will now be described. Five hundred liter of water was added to a reactor with a 1,000 liter capacity. Fifteen kg of globular iodine was added without crushing and sulfur dioxide was blown into the reactor while stirring. A mixture of hydrogen iodide and sulfuric acid, having a hydrogen iodide concentration of 30 g/liter was then made and slowly added to the reaction along with 67 kg of 300 mesh electrolytic copper and 134 kg of powdered iodine which has been crushed by the crusher. The contents are cooled so that the temperature within the reactor will not rise above 30° C. and the reaction is continued for about 1.5 hours until the reaction is complete. The copper iodide produced was segregated from the reaction solution as a sediment and dried after cleaning.

Figure 6:
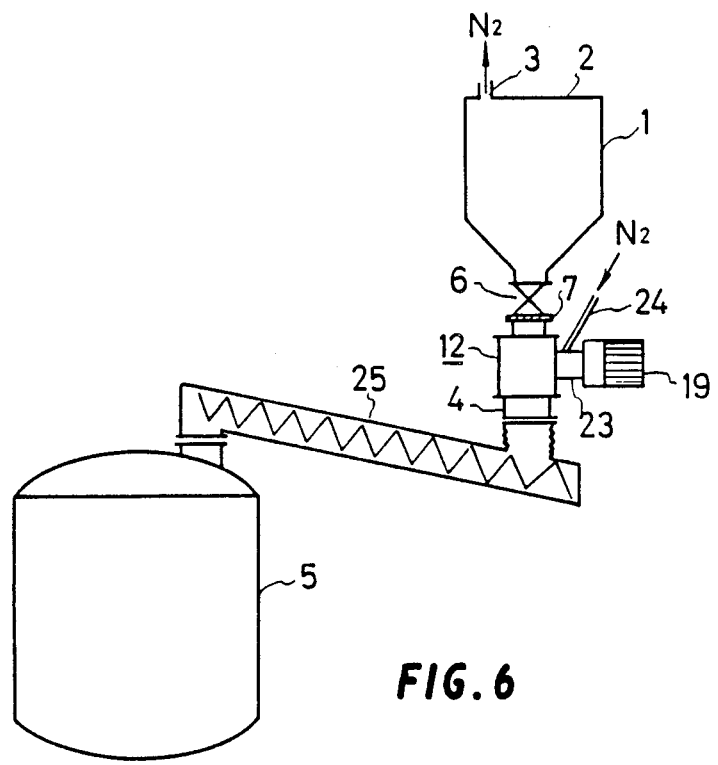
FIG. 6 is the front elevation of the third exemplary embodiment.

Finally, the third exemplary embodiment will be explained with reference to FIG. 6. A screw conveyor 25 is installed in passage 4 which connects the lower end of the crusher 12 in the second exemplary embodiment. Additionally, the reactor 5 is connected to the discharging end of the screw conveyor 25, and fed with powdered iodine.

This exemplary embodiment is convenient for use in situations in which the building is too low to join the hopper 1 and reactor 5 in series, or for the rare possibilty in which the reaction is severe and the effect of, for example, vapor on the hopper must be considered.

Other than as explained above, the operation of the third exemplary embodiment is the same as the second exemplary embodiment and therefore, further explanation is omitted.

In the present invention, good fluidity is obtained by using globular iodine, and thereby eliminating any clogging of the midway passage. The quantitative measurement can be easily performed and allows the operation of the process to proceed easily.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the quantitative continuous feeding of iodine using an apparatus comprising a sealable hopper, a reactor, a means for sealably connecting said hopper and said reactor, and a quantitative meter installed in said connecting means; comprising the steps of:
   adding globular iodine into said sealable hopper,
   passing the globular iodine under sealed conditions through said quantitative meter and said connecting means into said reactor to feed a constant quantity of iodine to said reactor.

2. The method of claim 1, further comprising:
   crushing the iodine after passing the iodine through said quantitative meter.

3. The method of claim 2, further comprising:
   transporting said iodine to said reactor via a screw conveyor, after said crushing step.

4. An apparatus for the quantitative continuous feeding of globular iodine, comprising:
   a sealable hopper;
   a reactor;
   a connecting means for sealable connecting said hopper and said reactor;
   a meter for quantitatively metering said globular iodine in said connecting means;
   a source of nitrogen gas; and
   a nitrogen gas inlet tube connected to said source, and integral with said connecting means and opening into said connecting means, whereby nitrogen gas flows in a direction opposite to the direction of said feeding of said iodine.

5. The apparatus of claim 4, wherein said connecting means comprises:
   a connecting passage between said hopper and said reactor for sealably connecting said hopper and said reactor;
   a first valve in said connecting passage between said hopper and said quantitative meter; and
   a second valve in said connecting passage between said quantitative meter and said reactor.

6. The apparatus of claim 5, further comprising:
   a crusher in said connecting passage between said quantitative meter and said second valve.

7. The apparatus of claim 6, wherein said crusher comprises:
   a housing, having therein an additional port for adding iodine, said housing being substantially open at its lower end;
   a shaft, extending horizontally through said housing;
   means for rotating said shaft;
   a plurality of rotary blades arranged horizontally in said housing;
   a plurality of vertical connecting rods, for connecting said rotary blades to said shaft;
   a circular arc-type wear plate below said rotary blades; and
   a plurality of fixed blades attached to said housing and said wear plate, whereby the rotating action of said rotary blades crushes the iodine between said rotary blades and said fixed blades.

8. The apparatus of claim 6, further comprising:
   a screw conveyer between said crusher and said reactor.

* * * * *